(12) United States Patent
Nayak et al.

(10) Patent No.: US 11,379,438 B2
(45) Date of Patent: Jul. 5, 2022

(54) DATABASE MIGRATION BETWEEN COMPUTING PLATFORMS USING VIRTUAL BACKUPS

(71) Applicant: ORACLE INTERNATIONAL CORPORATION, Redwood Shores, CA (US)

(72) Inventors: Chandramohan Maira Nayak, Fremont, CA (US); Arun Sathyamurthy, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 852 days.

(21) Appl. No.: 15/948,452

(22) Filed: Apr. 9, 2018

(65) Prior Publication Data
US 2019/0311040 A1 Oct. 10, 2019

(51) Int. Cl.
*G06F 7/00* (2006.01)
*G06F 16/21* (2019.01)
*G06F 11/14* (2006.01)

(52) U.S. Cl.
CPC ........ *G06F 16/214* (2019.01); *G06F 11/1451* (2013.01); *G06F 2201/84* (2013.01)

(58) Field of Classification Search
CPC . G06F 11/1451; G06F 2201/84; G06F 16/214
USPC ................................. 707/600–899
See application file for complete search history.

(56) References Cited

U.S. PATENT DOCUMENTS

| | | | |
|---|---|---|---|
| 8,949,197 B2 | 2/2015 | Wertheimer et al. | |
| 8,949,367 B2 | 2/2015 | Wertheimer et al. | |
| 2011/0145196 A1* | 6/2011 | Bender | G06F 3/0611 707/610 |
| 2014/0006357 A1* | 1/2014 | Davis | G06F 11/1464 707/667 |

OTHER PUBLICATIONS

Oracle Corporation, Zero Data Loss Recovery Appliance, Oracle White Paper, Sep. 2014, pp. 1-20, Oracle Corporation, Redwood Shores, CA.

* cited by examiner

*Primary Examiner* — Isaac M Woo
(74) *Attorney, Agent, or Firm* — Kraguljac Law Group, LLC

(57) ABSTRACT

Systems, methods, and other embodiments associated with database migration between platforms are described. In one embodiment, a method includes maintaining a full backup and one or more virtual full backups of a database hosted by a first platform of a first remote computing device. The example method may also include receiving a migration command to migrate the database from the first platform to a second platform of a second remote computing device. The example method may also include evaluating the one or more virtual full backups of the database to identify a target virtual full backup. The example method may also include performing a migration operation to migrate the database from the first platform to the second platform as a migrated database using the target virtual full backup.

19 Claims, 11 Drawing Sheets

DATABASE MIGRATION BETWEEN COMPUTING PLATFORMS USING VIRTUAL BACKUPS

BACKGROUND

Many entities, such as businesses, store data within databases. A database manager provides backup and restore functionality for a database. An initial full backup of the entire database is created. Subsequently, incremental backups of changes to the database since a last prior backup are then created. In this way, the initial full backup and any incremental backups can be used to restore the database, such as to restore corrupted data of the database. The database manager may provide migration functionality for the database, such as physical and/or logical migration. Such migration requires the creation of a separate full backup of the database to use for the migration. Creating the separate full backup for migration is resource intensive, consumes a large amount of storage, and can impact production systems relying on operation of the database because the database is placed into a read-only state during backup creation. Thus, current migration techniques require significant amounts of processing resources, storage resources, network bandwidth, and impact client access to data within the database.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
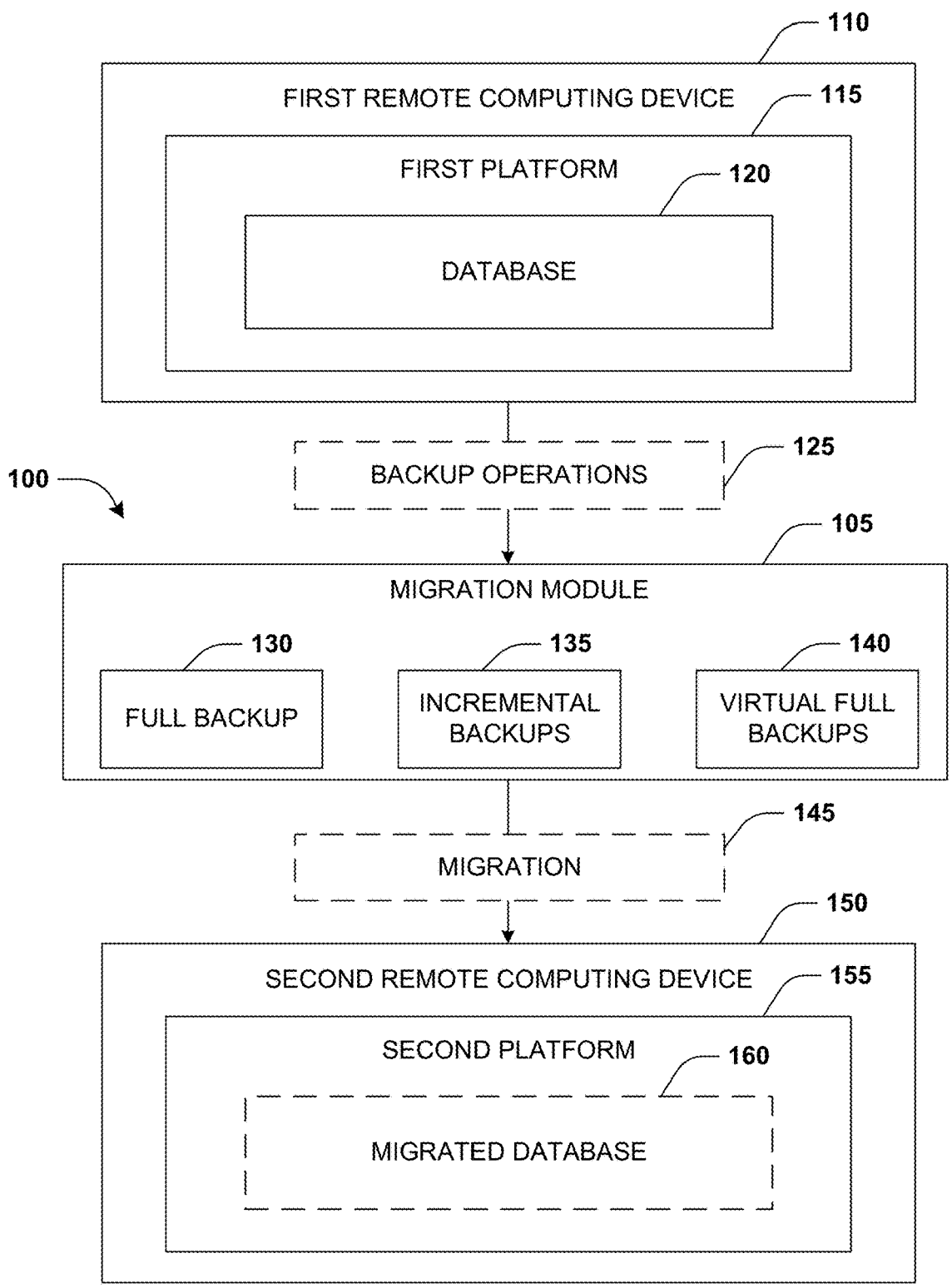
FIG. 1 illustrates an embodiment of a system associated with database migration between platforms.

Computerized systems and methods are described herein that provide for database migration between platforms. In particular, a migration module, such as a module incorporated into a zero data loss recovery appliance or other recovery appliance/computer, is configured to facilitate migration of a database from a first platform hosted on a first remote computing device to a second platform hosted on a second remote computing device. The first platform has an operating environment that is incompatible or different than an operating environment of the second platform, such as different types of operating systems, file systems, computer architectures, etc.

The migration module uses a virtual full backup to perform the migration of the database from the first platform to the second platform. The virtual full backup comprises references to data blocks of an incremental backup, data blocks of previous incremental backups that occurred prior to the incremental backup, and data blocks of a full backup of the database. That is, an initial full backup of the database is created, and thus comprises data blocks representing the entire database. Subsequently, an incremental backup of the database is created at a first point in time, and thus comprises data blocks representing changes made to the database since a last backup (the initial full backup). In this way, incremental backups are periodically made to capture changes made to the database since a last backup. The virtual full backup comprises the references to the data blocks of the existing incremental backups and the initial full backup, and thus the references can be used to access all the data blocks of the database at a particular point in time.

Because the virtual full backup leverages already existing full and incremental backups, the migration module does not require the creation of a separate full backup for the purpose of migration. In this way, computer resources, storage resources, and network bandwidth otherwise wasted in creating, transmitting, and storing the separate full backup are conserved to improve operation of computers hosting the migration module and the database.

Thus, the migration module implements a migration technique that provides a technical solution to a technical problem deeply rooted in computer technology of how to migrate a database between heterogeneous platforms without wasting computer resources otherwise used to create a full separate backup just for migration. Instead, the migration module can migrate the database between the heterogeneous platforms using an existing virtual full backup with metadata referencing already existing data blocks used for migration. Also, because the integrity of the existing backups were already verified, the risk of corruption or errors during migration is greatly reduced, and thus improving upon existing migration techniques that require a separate verification or do not provide any verification as part of the migration process. Further, the impact upon a production system that uses the database is minimized because the database does not need to be taken offline or placed into a read-only state for the duration of creating an entire full backup of the database. In this way, existing migration techniques are improved by performing the migration using virtual full backups.

With reference to FIG. 1, one embodiment of a system 100 associated with database migration between platforms is illustrated. The system 100 is implemented as a migration module 105 hosted on a computing device, such as a zero data loss recovery appliance or other recovery appliance/ computer, such as the computer 515 of FIG. 5. In one embodiment, the recovery appliance is a computer comprising backup and restore functionality that can be provided for databases hosted by other computers. The migration module 105 establishes a first connection over a network with a first remote computing device 110 hosting a first platform 115, such as a first type of operating system. The migration module 105 establishes a second connection over the network with a second remote computing device 150 hosting a second platform 155, such as a second type of operating system that is incompatible with the first type of operating system. The platforms may be incompatible in that they may store data according to different data block sizes, they may use different file systems that physically store data in different ways and/or logically reference data in different ways, they utilize different database versions, they utilize different chip architectures, they use different endiannes, etc.

Backup operations 125 are performed to backup data from a database 120 hosted by the first platform 115 to the migration module 105, such as to the zero data loss recovery appliance. The backup operations 125 can comprise a full backup operation that creates a full backup 130 of the database 120. The backup operations 125 can comprise incremental backup operations that create incremental backups 135 of changes to the database 120 since a last backup. Virtual full backups 140 are created based upon the full backup 130 and the incremental backups 135. A virtual full backup is created for each incoming incremental backup. A virtual full backup for an incoming incremental backup comprises references to data blocks of the full backup 130, data blocks of the incoming incremental backup, and data blocks of previous incremental backups that occurred before the incoming incremental backup. In this way, multiple virtual full backups are created and maintained over time because a virtual full backup is created for each incoming incremental backup.

The migration module 105 is configured to perform a migration command to migrate the database 120 from the first platform 115 to the second platform 155 to create a migrated database 160 hosted by the second platform. The migration module 105 selects a virtual full backup to use for migrating 145 data of the database 120 into the migrated database. In one embodiment, the virtual full backup is selected based upon the virtual full backup being a latest backup of data that is to be migrated. That is, multiple virtual full backups are created over time, and thus are available to use for restoring the database and for performing migration. Each virtual full backup may be associated with a timestamp or other indicator corresponding to a point in time in which the virtual full backup was created, a creation time of an incoming incremental backup from which the virtual full backup was created, or some other time. Thus, the timestamps are evaluated to identify which virtual full backup is the latest back up of the data to be migrated.

The virtual full backup is evaluated to identify references to data blocks of a corresponding incremental backup for which the virtual full backup was created, data blocks of prior incremental backups, and data blocks of the full backup 130. In this way, the references are used to identify and migrate 145 those data blocks, such as data files of the database 120, into the migrated database 160. The database 120 can be removed from the first platform 115 to complete the migration operation. In this way, the database 120 is migrated between heterogeneous such as incompatible platforms without wasting computer resources, storage resources, and network bandwidth to create a separate full backup merely for the migration operation because the database 120 is instead migrated using the virtual full backup. The database 120 can be migrated between two heterogeneous platforms because the references within the virtual full backup can be used to access the data blocks needed for migration. In this way, the data blocks are migrated to the second platform into the migrated database 160. Merely migrating data blocks between platforms circumvents issues otherwise arising from attempts to use software migration applications that would need to translate between communication protocols, data storage formats, operating system commands, and/or other incompatible functionality of the two platforms.

Figure 2:
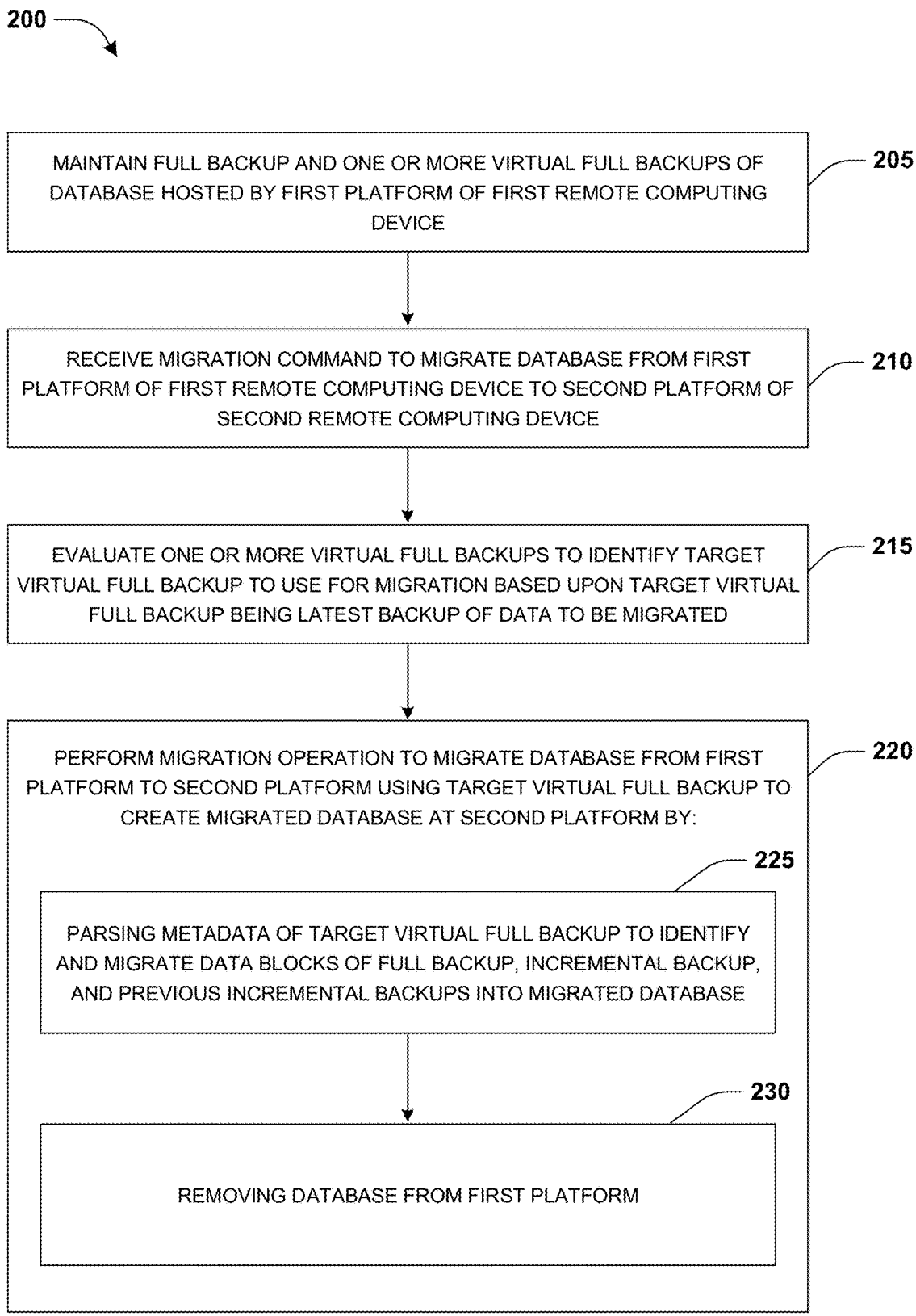
FIG. 2 illustrates an embodiment of a method associated with database migration between platforms.

With reference to FIG. 2, one embodiment of a computer implemented method 200 associated with database migration between platforms is illustrated. In one embodiment, the method 200 is performed by the migration module 105 utilizing various computing resources of the computer 515 or other computers such as a zero data loss recovery appliance or other recovery appliance/computer. The computing resources, such as the processor 520, are used for executing instructions associated with migrating databases. Memory 535 and/or disks 555 are used for storing data structures of commands for performing database migration. Network hardware is used for communication of backup commands, migration commands, and/or database data between the computer 515 and remote computers over a network, such as for migrating database data between platforms. The method 200 is triggered upon determining that a migration command is to be executed.

Figure 3A:
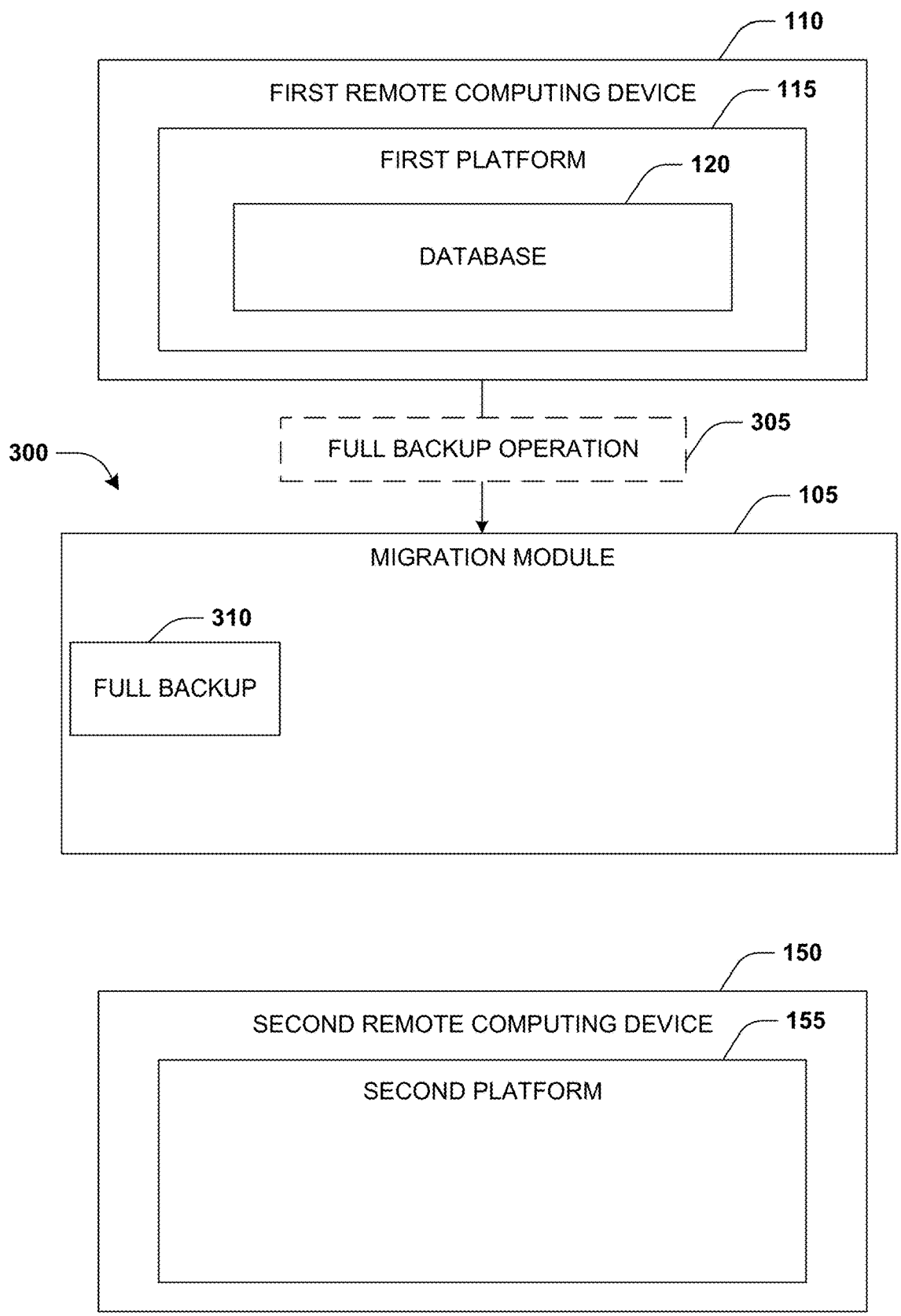
FIG. 3A illustrates an embodiment of a system associated with database migration between platforms, where a full backup is created.

In one embodiment, the migration module 105 is associated with a recovery appliance configured to backup data from the database 120 hosted by the first platform 115 of the first remote computing device 110, as illustrated by example system 300 of FIG. 3A. The recovery appliance can be a standalone computing device or any other type of computer configured with database backup and restore functionality. The migration module 105 can be integrated into the recovery appliance or communicatively coupled to the recovery appliance over a network for interacting with the recovery appliance. Backup data from the database 120 can be stored within storage devices associated with the recovery appliance and/or transmitted to remote computers and storage.

To perform backups from the database 120 to the recovery appliance, a first connection is established over a network to the first platform 115. A full backup command is issued to the database 120 to perform a full backup operation 305 of the database 120 to create a full backup 310 of the database. The full backup 310 comprises data files of the database 120 that are transmitted from the first remote computing device 110 over the first connection to the recovery appliance. The full backup 310 can be stored within storage devices such as locally attached storage devices and/or within other remote computing devices and storage. A verification is performed upon the full backup 310 to verify an integrity of the full backup 310, such as to ensure there is no missing or corrupt data.

Figure 3B:
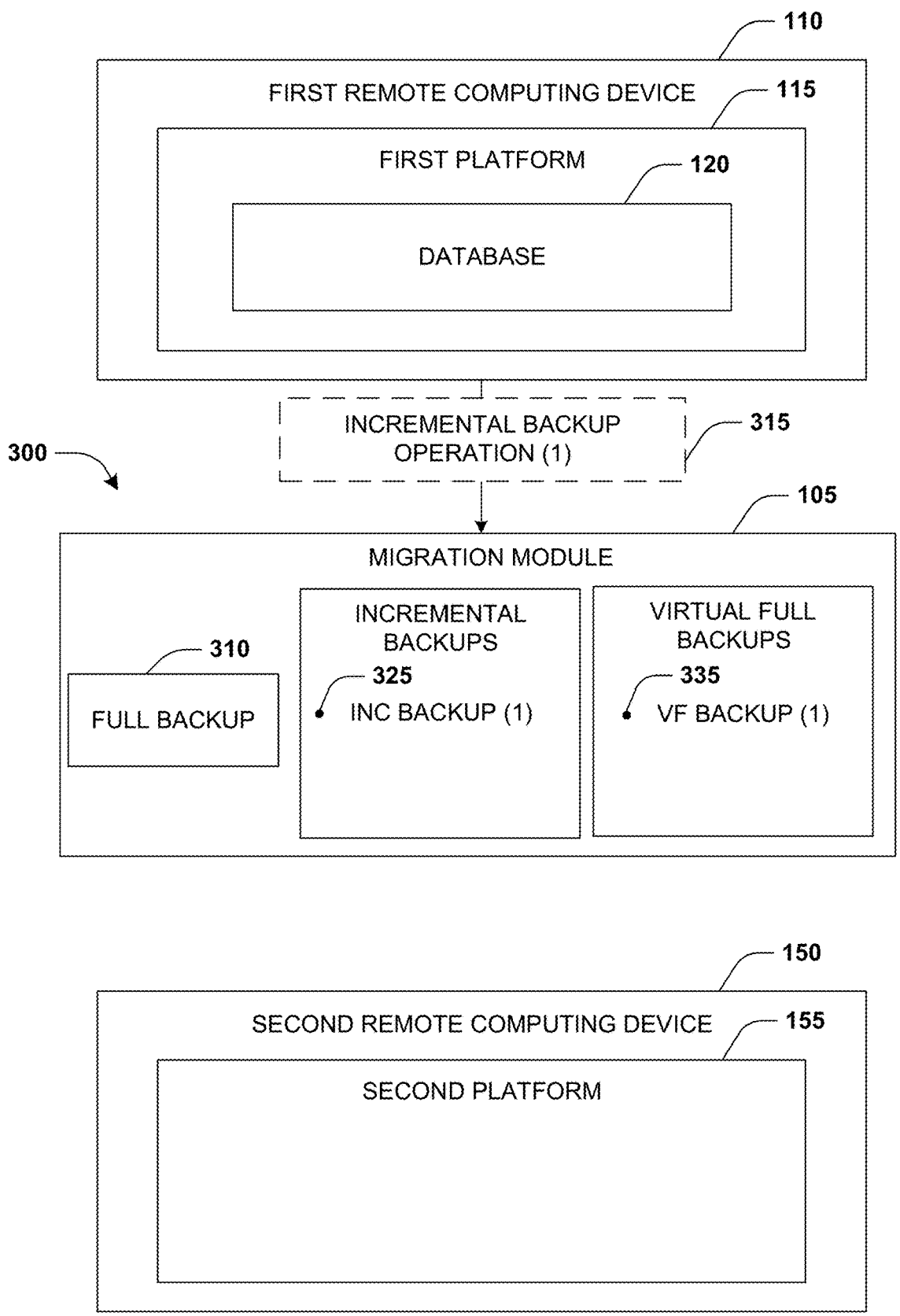
FIG. 3B illustrates an embodiment of a system associated with database migration between platforms, where a first incremental backup is created.

Because the data of the database 120 will change over time, incremental backup commands are periodically issued to the database 120 to perform periodic incremental backup operations to backup changes made to the database 120 since a last backup operation to the recovery appliance, as illustrated by FIG. 3B. In one embodiment, a first incremental backup operation 315 is performed to transmit changes made to the database 120 since the full backup 310 (the last prior backup) as a first incremental backup 325. The first incremental backup 325 is stored by the recovery appliance, such as within the local storage devices or transmitted to the remote computing devices and storage. A verification is performed upon the first incremental backup 325 to verify an integrity of the first incremental backup 325, such as to ensure there is no missing or corrupt data.

A first virtual full backup 335 is generated for the incoming first incremental backup 325. The first virtual full backup 335 is created by converting the incoming first incremental backup 325 corresponding to a first point in time to a virtual representation of an incremental full backup as of the first point in time to create the first virtual full backup 335. In particular, the first virtual full backup 335 is created to comprise metadata referencing data blocks of the incoming first incremental backup 325, data blocks of previous incremental backups that occurred prior to the incoming first incremental backup 325 (if any), and data blocks of the full backup 310. In this way, storage space is conserved by merely using references to existing data blocks of backups as opposed to re-storing such data blocks as a new full backup.

Figure 3C:
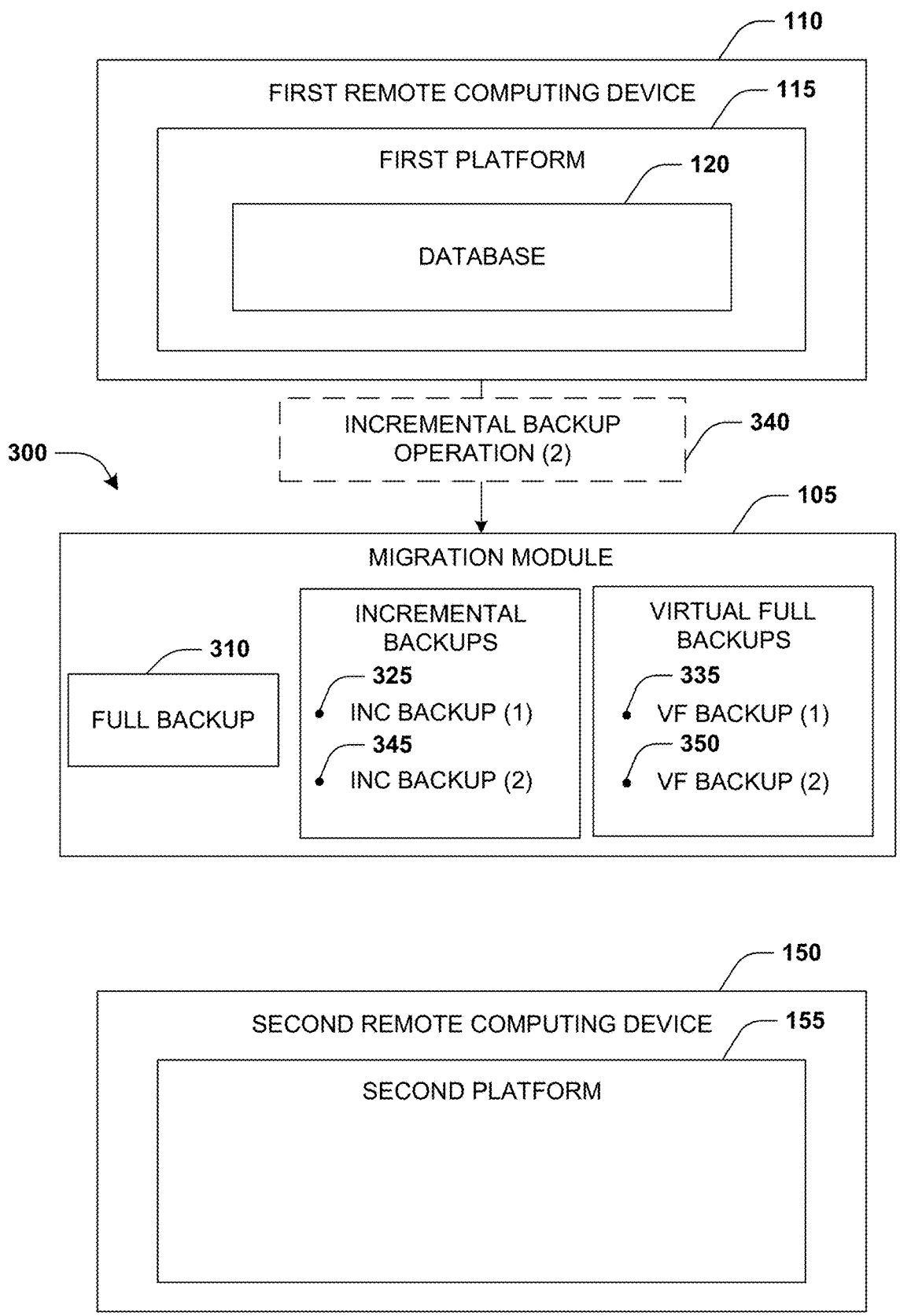
FIG. 3C illustrates an embodiment of a system associated with database migration between platforms, where a second incremental backup is created.

In this way, incremental backups and virtual full backups are periodically created, such as where a second incremental backup operation 340 is performed, as illustrated by FIG. 3C. The second incremental backup operation 340 is performed to transmit changes made to the database 120 since the first incremental backup 325 (the last prior backup) as a second incremental backup 345. The second incremental backup 345 is stored by the recovery appliance, such as within the local storage devices or transmitted to the remote computing devices and storage. A verification is performed upon the second incremental backup 345 to verify an integrity of the second incremental backup 345, such as to ensure there is no missing or corrupt data.

A second virtual full backup 350 can be generated for the incoming second incremental backup 345. The second virtual full backup 350 is created by converting the incoming second incremental backup 345 corresponding to a second point in time to a virtual representation of an incremental full backup as of the second point in time to create the second virtual full backup 350. In particular, the second virtual full backup 350 is created to comprise metadata referencing data blocks of the incoming second incremental backup 345, data blocks of previous incremental backups that occurred prior to the incoming second incremental backup 345 such as data blocks of the first incremental backup 325, and data blocks of the full backup 310. In this way, storage space is conserved by merely using references to existing data blocks of backups as opposed to re-storing such data blocks as a new full backup. In this way, the full backup 310 and one or more incremental backups of the database 120 hosted by the first platform of the first remote computing device 110 are maintained, at 205.

In one embodiment, virtual full backups can be used to restore data of the database 120, such as corrupted data. In particular, the virtual full backups are evaluated to identify a virtual full backup to use for restoring the data of the database 120. The virtual full backup is identified based upon the virtual full backup being a latest backup of the data to be restored. The virtual full backup may be selected based upon the virtual full backup having a timestamp, corresponding to a time when the virtual full backup was created, that is later in time than timestamps of other virtual full backups. Accordingly, the virtual full backup is used to restore the data of the database 120 by storing data blocks, referenced by the virtual full backup, into the database 120 to replace the data to be restored. Various types of database restore operations can be performed using the full backup 310, the incremental backups, and the virtual full backups, such as a full restore, a partial restore, a roll back to a prior state of the database 120, a restore of corrupted data, etc.

Figure 3D:
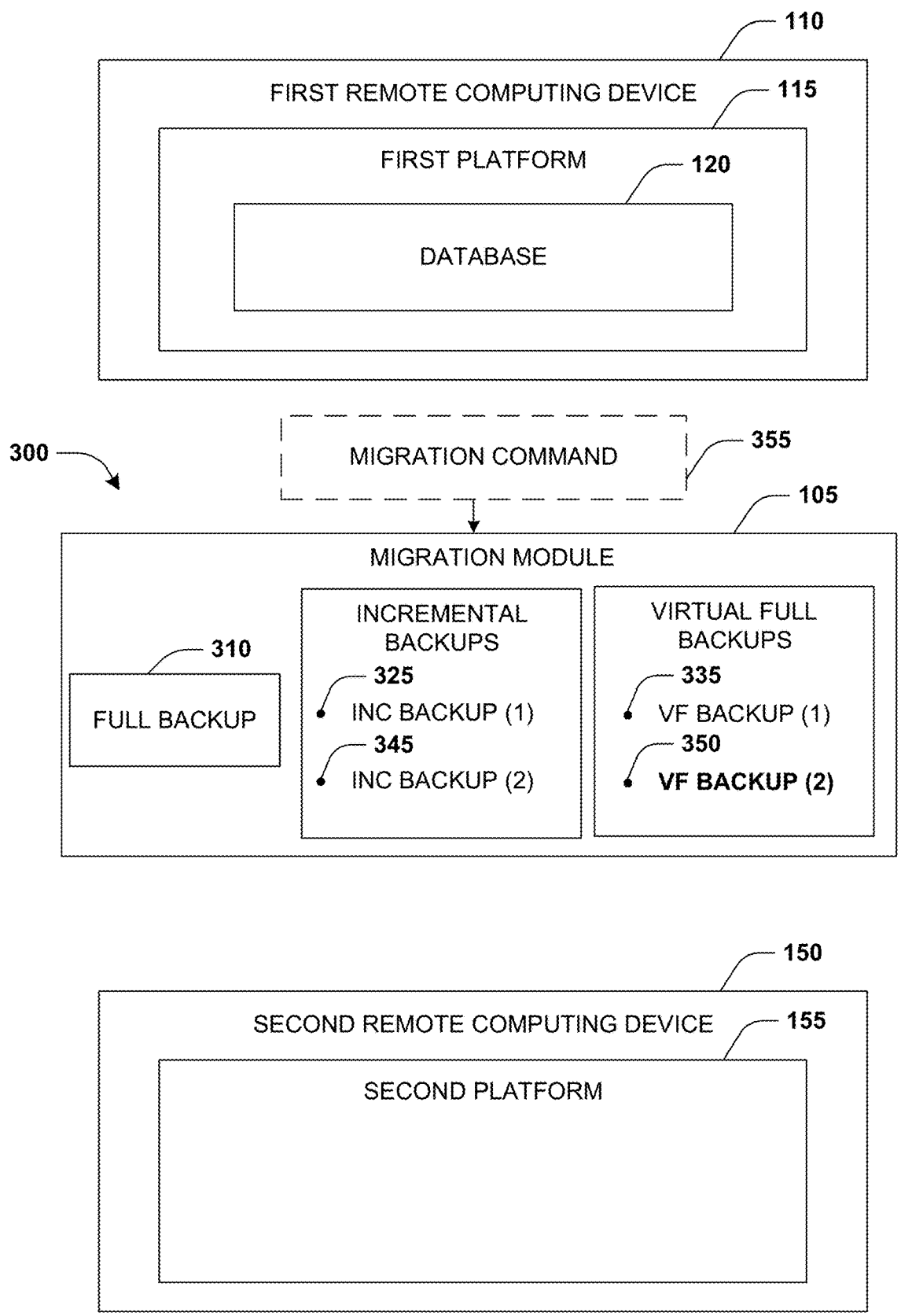
FIG. 3D illustrates an embodiment of a system associated with database migration between platforms, where a target virtual full backup is identified.

At 210, a migration command 355 is received by the migration module 105 to migrate the database 120 from the first platform 115 of the first remote computing device 110 to the second platform 155 of the second remote computing device 150, as illustrated by FIG. 3D. In one embodiment, the database 120 is to be migrated between heterogeneous platforms. That is, the first platform has a first operating environment, such as an operating system, that is different than and/or incompatible with a second operating environment of the second platform, such as a second operating system. The platforms may be incompatible in that they use different file systems, use different underlying computer architectures, store data according to different block sizes, use different programming languages and syntax, different APIs, different commands, have different operating system types or versions, etc.

Upon receiving the migration command 355, the migration module 105 parses the migration command 355 to identify a set of tablespaces of the database 120 for migration. A tablespace is a storage location where actual data underlying database objects of the database 120 are stored. Data files associated with the set of tablespaces to migrate are identified. For example, the tablespace specifies the storage location of a data file to migrate. In this way, data files to migrate are identified based upon the set of tablespaces.

In one embodiment, a database function is executed to determine whether the set of tablespaces are transportable to the second platform 155. Various criteria can be used to determine whether a tablespace is transportable between platforms, such as where the source and target database must use the same character set, the target database cannot comprise an existing tablespace with a same name, database objects with underlying objects cannot be transportable unless all underlying objects are in the same tablespace set, etc. Other criteria can be that tablespaces that do not use encryption but contain tables with encrypted columns cannot be transported. Criteria relating to tablespaces with XML types can be where the target database must have an XML database installed, schemas referenced by XML type tables cannot be an XML database standard scheme, schemes referenced by XML type tables cannot have cyclic dependencies, XML type tables with row level security cannot be transported, etc. If the set of tablespaces is not transportable, then an error messages is created in response to the migration command 355.

At 215, the one or more virtual full backups are evaluated to identify a target virtual full backup to use for the migration based upon the target virtual full backup being a latest backup of the data files to be migrated. In one embodiment, the second virtual full backup 350 is identified as the latest backup of the data files to be migrated based upon the second virtual full backup 350 having a timestamp that is later in time than timestamps of other virtual full backups. In another embodiment, a new virtual full backup is created to use as the target virtual full backup, instead of selecting an existing virtual full backup. For example, a command is transmitted to the first platform 115 to transition the database 120 into a read-only state for creating a new incremental backup. The first platform 115 is invoked to create the new incremental backup to comprise changes made to the database 120 since a last prior backup (the second incremental backup 345) with respect to the new incremental backup. Accordingly the migration module 105 receives the new incremental backup from the first platform over the network. The migration module 105 utilizes the new incremental backup to create the target virtual full backup to use for migration. The command instructs the first platform 115 to transition the database 120 into a read and write state in response to the new incremental backup being created.

Figure 3E:
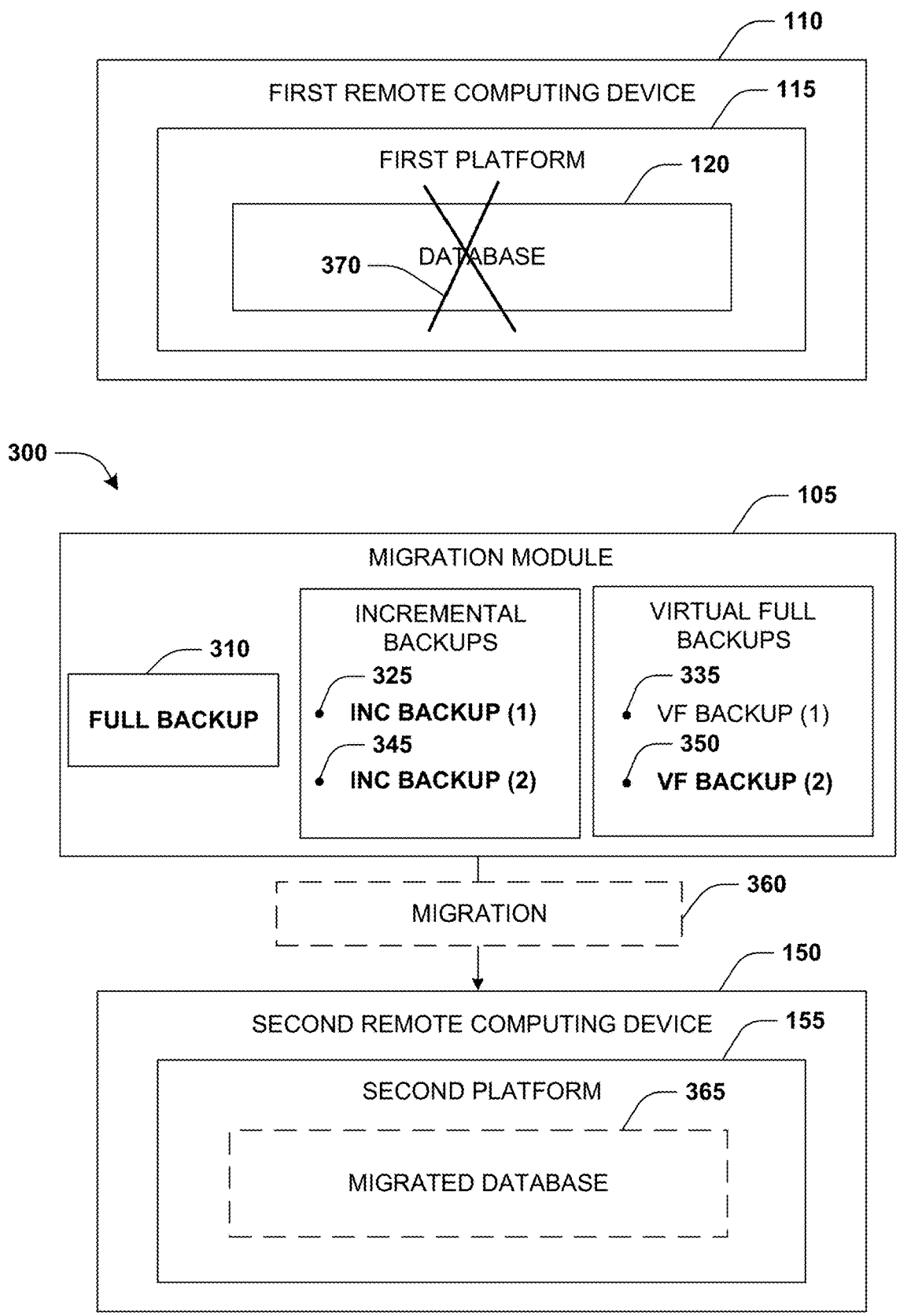
FIG. 3E illustrates an embodiment of a system associated with database migration between platforms, where a target virtual full backup is used to migrate the database from a first platform to a second platform.

At 220, a migration operation 360 is performed to migrate the database 120 from the first platform 115 to the second platform 155 of the second remote computing device 150 to create a migrated database 365 at the second platform 155, as illustrated by FIG. 3E. The migration operation 360 parses the metadata of the target virtual full backup such as the second virtual full backup 350 to identify references to data blocks, within backups, that are to be used for migration, at 225. The metadata of the second virtual full backup 350 is parsed to identify data blocks of the full backup 310. The metadata of the second virtual full backup 350 is parsed to identify data blocks of the second incremental backup 345 from which the second virtual full backup 350 was created. The metadata of the second virtual full backup 350 is parsed to identify data blocks of the previous incremental backups that occurred prior to the second incremental backup 345, such as the first incremental backup 325. In this way, the identified data blocks are migrated from the backup data into the migrated database 365. At 230, the database 120 is removed 370 from the first platform 115 as part of the migration operation 360. In other embodiments, the database 120 is not removed 370, but is retained at the first platform 115.

In another embodiment of migrating the database 120, at least one of the full backup 310, an incremental backup, and/or a virtual full backup are maintained and used for one or more migration operations. Either the full backup 310 or a virtual full backup is used to start a migration operation to migrate data of the database 120 hosted by the first platform 115 to the second platform 155 to create the migrated database 365. In one embodiment, a latest full or virtual backup is selected and used to perform a first migration. Upon starting the first migration operation, an incremental backup operation is performed at the first remote computing device 110 upon the database 120 to create an incremental backup. The migration module 105 selectively uses one or more backups for continuing the migration. The migration module 105 can selectively utilize one or more of the full backup 310, the incremental backup, and a virtual backup based upon which backup has the latest data to be migrated. The data within the selected backup is restored to the migrated database 365. If the full backup 310 is selected, then the entire data is restored to the migrated database 365. If the incremental backup is selected, then data of the incremental backup (e.g., the incremental backup is of 10 blocks of a total 1000 blocks of the database 120) is recovered to the migrated database 365, such as to overwrite any existing data. In this way, a second migration is performed, such as where an incremental backup or a virtual full backup is selected and used for the second migration (e.g., instead of the full backup 310.

In one embodiment of creating a backup to use for the first initial migration or any subsequent migration, the migration module 105 transitions tablespaces of the database 102 at the first platform 115 into a read only state, and a final backup operation is performed upon the database 120 to create a final backup. The database 120 is transitioned to the read only state merely for the creation of a consistent backup copy of the database 120, such as the final backup. A migration operation is performed using the final backup to migrate data within the final backup of the database 120 to the migrated database 365 at the second platform 155. In this way, a switchover from the database 120 to the migrated database 365 is performed.

In one embodiment, the migrated database 365 may be backed up to the recovery appliance. For example, a full backup operation of the migrated database 365 is performed to create a full backup of the migrated database 365 that is transmitted to the recovery appliance. Incremental backup operations are performed to create incremental backups of changes that occurred to the migrated database 365 since last backups were performed. The incremental backups are transmitted to the recovery appliance. Virtual full backups of the migrated database 365 are created as incoming incremental backups are received.

Accordingly, when a request to restore data of the migrated database 365 is received from the second platform 155, the virtual full backups of the migrated database 365 are evaluated to identify a virtual full backup to use for restoring the data. The virtual full backup is identified based upon the virtual full backup being a latest backup of the data. In this way, the virtual full backup is used to restore the data of the migrated database 365 by restoring data blocks, referenced by metadata of the virtual full backup, into the migrated database 365 to replace the data. Such data block comprise data blocks of the full backup of the migrated database 365, data blocks of an incremental backup from which the virtual full backup was created, and data blocks of previous incremental backups that occurred before the incremental backup. Other types of database restore operations such as a full restore, a partial restore, a roll back to a prior state of the migrated database 365, etc. can be performed using the virtual full backup, the full backup, and the incremental backups.

Figure 4:
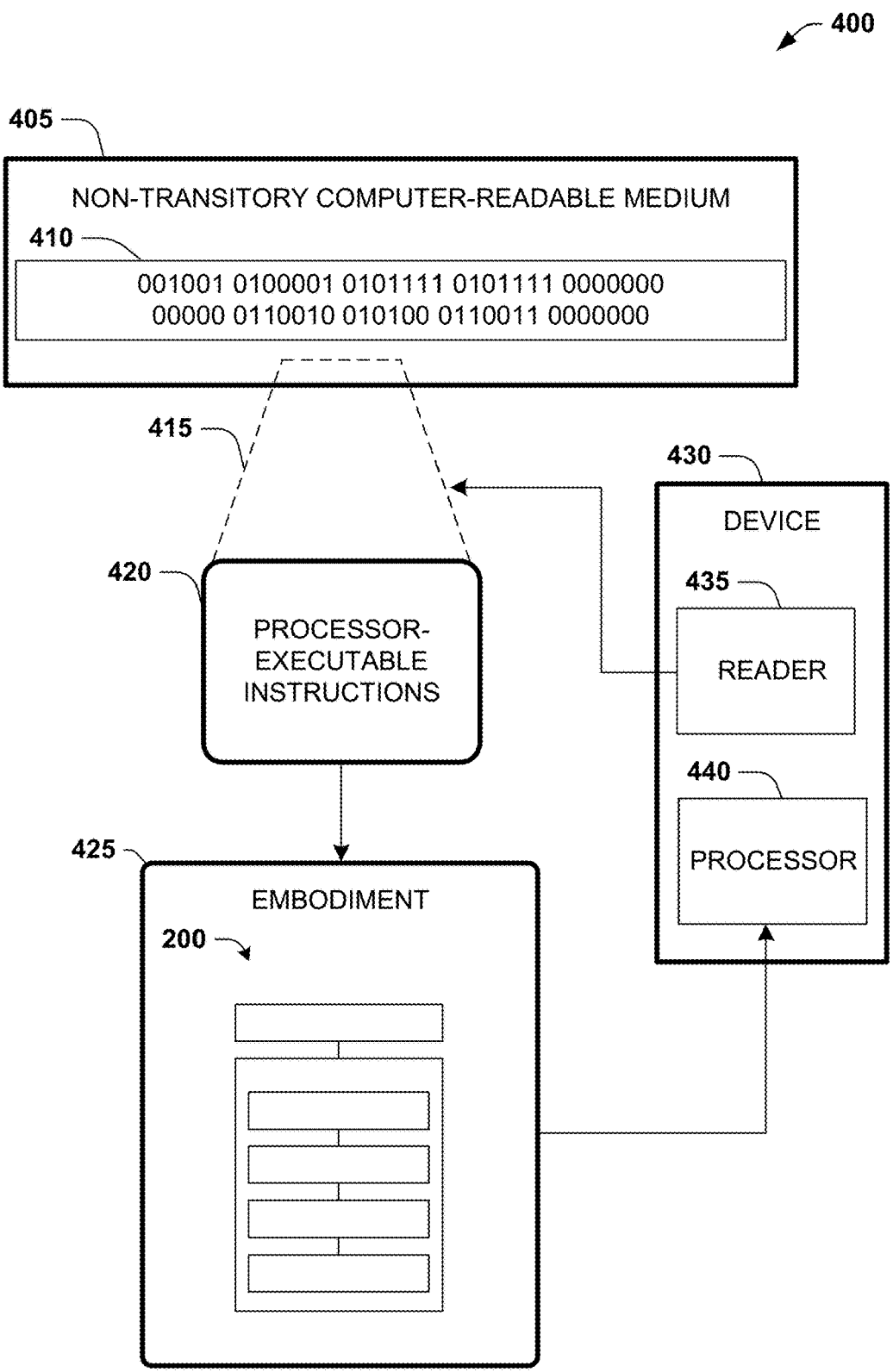
FIG. 4 illustrates an embodiment of a non-transitory computer-readable medium.

FIG. 4 is an illustration of a scenario 400 involving an example non-transitory computer-readable medium 405. In one embodiment, one or more of the components described herein are configured as program modules, such as the migration module 105, stored in the non-transitory computer-readable medium 405. The program modules are configured with stored instructions, such as processor-executable instructions 420, that when executed by at least a processor, such as processor 440, cause the computing device to perform the corresponding function(s) as described herein. In one embodiment, the functionality of the migration module 105, stored in the non-transitory computer-readable medium 405, may be executed by the processor 440 as the processor-executable instructions 420 to perform an embodiment 425 of the method 200 of FIG. 2.

The non-transitory computer-readable medium 405 includes the processor-executable instructions 420 that when executed by a processor 440 cause performance of at least some of the provisions herein. The non-transitory computer-readable medium 405 includes a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory computer-readable medium 405 stores computer-readable data 410 that, when subjected to reading 415 by a reader 435 of a device 430 (e.g., a read head of a hard disk drive, or a read operation invoked on a solid-state storage device), express the processor-executable instructions 420.

In some embodiments, the processor-executable instructions 420, when executed cause performance of operations, such as at least some of the example method 200 of FIG. 2, for example. In some embodiments, the processor-executable instructions 420 are configured to cause implementation of a system, such as at least some of the example system 100 of FIG. 1, for example.

Figure 5:
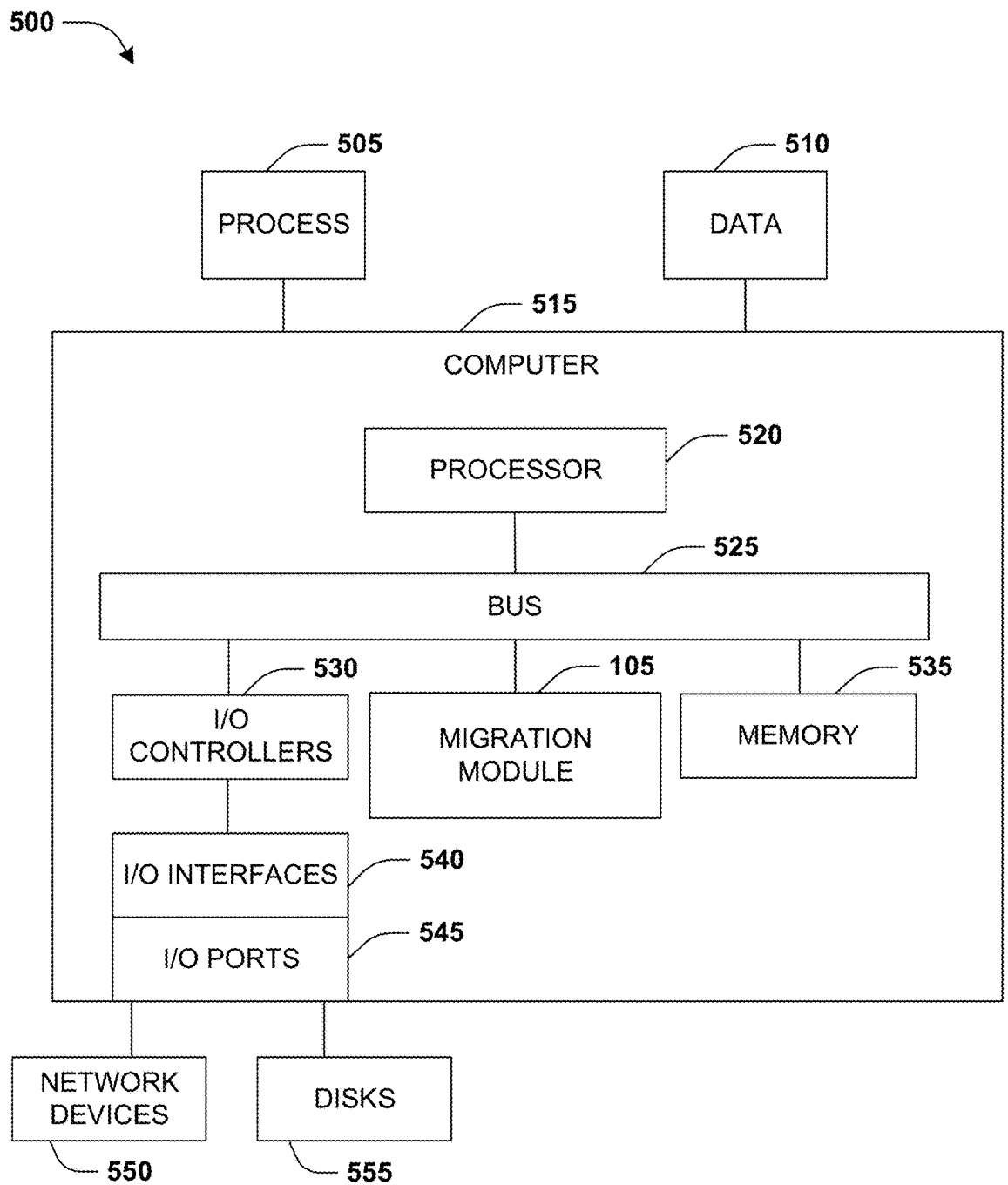
FIG. 5 illustrates an embodiment of a computing system configured with the example systems and/or methods disclosed.

FIG. 5 illustrates an example computing device 500 that is configured and/or programmed with one or more of the example systems and methods described herein, and/or equivalents. The example computing device 500 may be the computer 515 that includes a processor 520, a memory 535, and I/O ports 545 operably connected by a bus 525. In one embodiment, the computer 515 may include logic of the migration module 105 configured to facilitate the system 100 and/or the method 200 shown in FIGS. 1-2. In different embodiments, the logic of the migration module 105 may be implemented in hardware, a non-transitory computer-readable medium 505 with stored instructions, firmware, and/or combinations thereof. While the logic of the migration module 105 is illustrated as a hardware component attached to the bus 525, it is to be appreciated that in other embodiments, the logic of the migration module 105 could be implemented in the processor 520, stored in memory 535, or stored in disk 555.

In one embodiment, logic of the migration module 105 or the computer 515 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to implement rule based source sequencing for allocation. The means may also be implemented as stored computer executable instructions that are presented to computer 515 as data 510 that are temporarily stored in memory 535 and then executed by processor 520.

The logic of the migration module 105 may also provide means (e.g., hardware, non-transitory computer-readable medium 505 that stores executable instructions, firmware) for performing rule based source sequencing for allocation.

Generally describing an example configuration of the computer 515, the processor 520 may be a variety of various processors including dual microprocessor and other multiprocessor architectures. The memory 535 may include volatile memory and/or non-volatile memory. Non-volatile memory may include, for example, read-only memory (ROM), programmable read-only memory (PROM), and so on. Volatile memory may include, for example, random access memory (RAM), static random-access memory (SRAM), dynamic random access memory (DRAM), and so on.

The disks 555 may be operably connected to the computer 515 via, for example, the I/O interface 540 (e.g., card, device) and the I/O ports 545. The disks 555 may be, for example, a magnetic disk drive, a solid state disk drive, a floppy disk drive, a tape drive, a Zip drive, a flash memory card, a memory stick, and so on. Furthermore, the disks 555 may be a CD-ROM drive, a CD-R drive, a CD-RW drive, a DVD ROM, and so on. The memory 535 can store a process, such as within the non-transitory computer-readable medium 505, and/or data 510, for example. The disk 555 and/or the memory 535 can store an operating system that controls and allocates resources of the computer 515.

The computer 515 may interact with input/output (I/O) devices via the I/O interfaces 540 and the I/O ports 545. The I/O devices may be, for example, a keyboard, a microphone, a pointing and selection device, cameras, video cards, displays, the disks 555, the network devices 550, and so on. The I/O ports 545 may include, for example, serial ports, parallel ports, and USB ports. I/O controllers 530 may connect the I/O interfaces 540 to the bus 525.

The computer 515 can operate in a network environment and thus may be connected to the network devices 550 via the I/O interfaces 540, and/or the I/O ports 545. Through the network devices 550, the computer 515 may interact with a network. Through the network, the computer 515 may be logically connected to remote computers (e.g., the computer 515 may reside within a distributed computing environment to which clients may connect). Networks with which the computer 515 may interact include, but are not limited to, a local area network (LAN), a new area network (WAN), and other networks.

Figure 6:
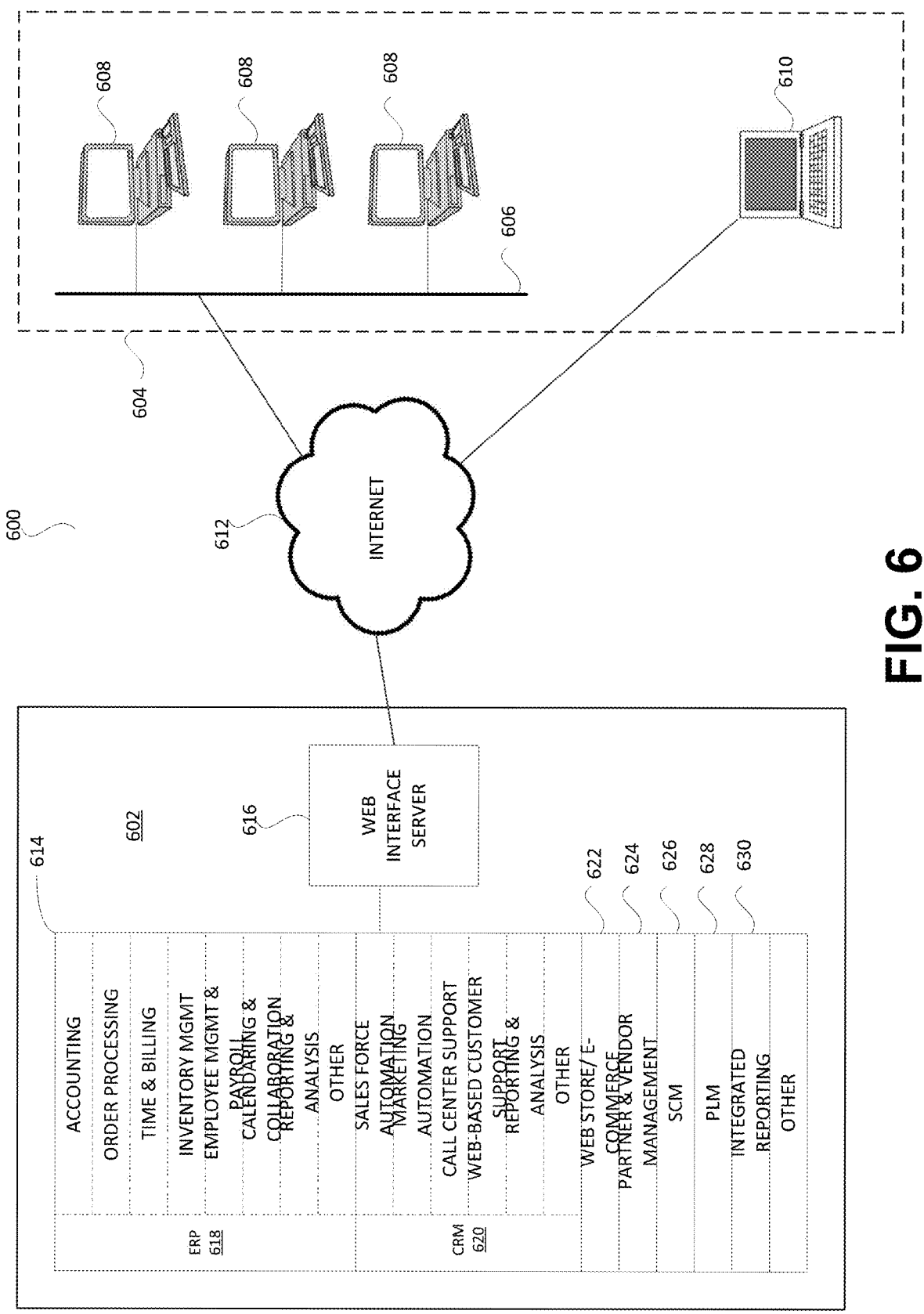
FIG. 6 illustrates an embodiment of an integrated business system and an enterprise network in which an embodiment of the invention may be implemented.

FIG. 6 is a diagram illustrating a system 600 in which an embodiment of the invention may be implemented. Enterprise network 604 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection.

For simplicity and clarity of explanation, the enterprise network 604 is represented by an on-site local area network 606 to which a plurality of personal computers 608 are connected, each generally dedicated to a particular end user, such as a service agent or other employee (although such dedication is not required), along with an exemplary remote user computer 610 that can be, for example, a laptop computer or tablet computer of a traveling employee having internet access through a public Wi-Fi access point, or other internet access method. The end users (consumers) associated with computers 608 and 610 may possess an internet-enabled smartphone or other electronic device (such as a PDA, tablet, laptop computer) having wireless internet access or other synchronization capabilities. Users of the enterprise network 604 interface with the integrated business system 602 across the Internet 612 or another suitable communications network or combination of networks.

Integrated business system 602, which may be hosted by a dedicated third party, may include an integrated business server 614 and a web interface server 616, coupled as shown in FIG. 6. It is to be appreciated that either or both of the integrated business server 614 and the web interface server 616 may be implemented on one or more different hardware systems and components, even though represented as singular units in FIG. 6.

In a typical example in which system 602 is operated by a third party for the benefit of multiple account owners/tenants, each of whom is operating a business, integrated business server 614 comprises an ERP module 618 and further comprises a CRM module 620. In many cases, it will be desirable for the ERP module 618 to share methods, libraries, databases, subroutines, variables, etc., with CRM module 620, and indeed ERP module 618 may be intertwined with CRM module 620 into an integrated Business Data Processing Platform (which may be single tenant, but is typically multi-tenant).

The ERP module 618 may include, but is not limited to, a finance and accounting module, an order processing module, a time and billing module, an inventory management and distribution module, an employee management and payroll module, a calendaring and collaboration module, a reporting and communication module, and other ERP-related modules. The CRM module 620 may include, but is not limited to, a sales force automation (SFA) module, a marketing automation module, a contact list module (not shown), a call center support module, a web-based customer support module, a reporting and communication module, and other CRM-related modules.

The integrated business server 614 (or multi-tenant data processing platform) further may provide other business functionalities including a web store/eCommerce module 622, a partner and vendor management module 624, and an integrated reporting module 630. An SCM (supply chain management) module 626 and PLM (product lifecycle management) module 628 may also be provided. Web interface server 616 is configured and adapted to interface with the integrated business server 614 to provide one or more web-based user interfaces to end users of the enterprise network 604.

The integrated business system shown in FIG. 6 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 7:
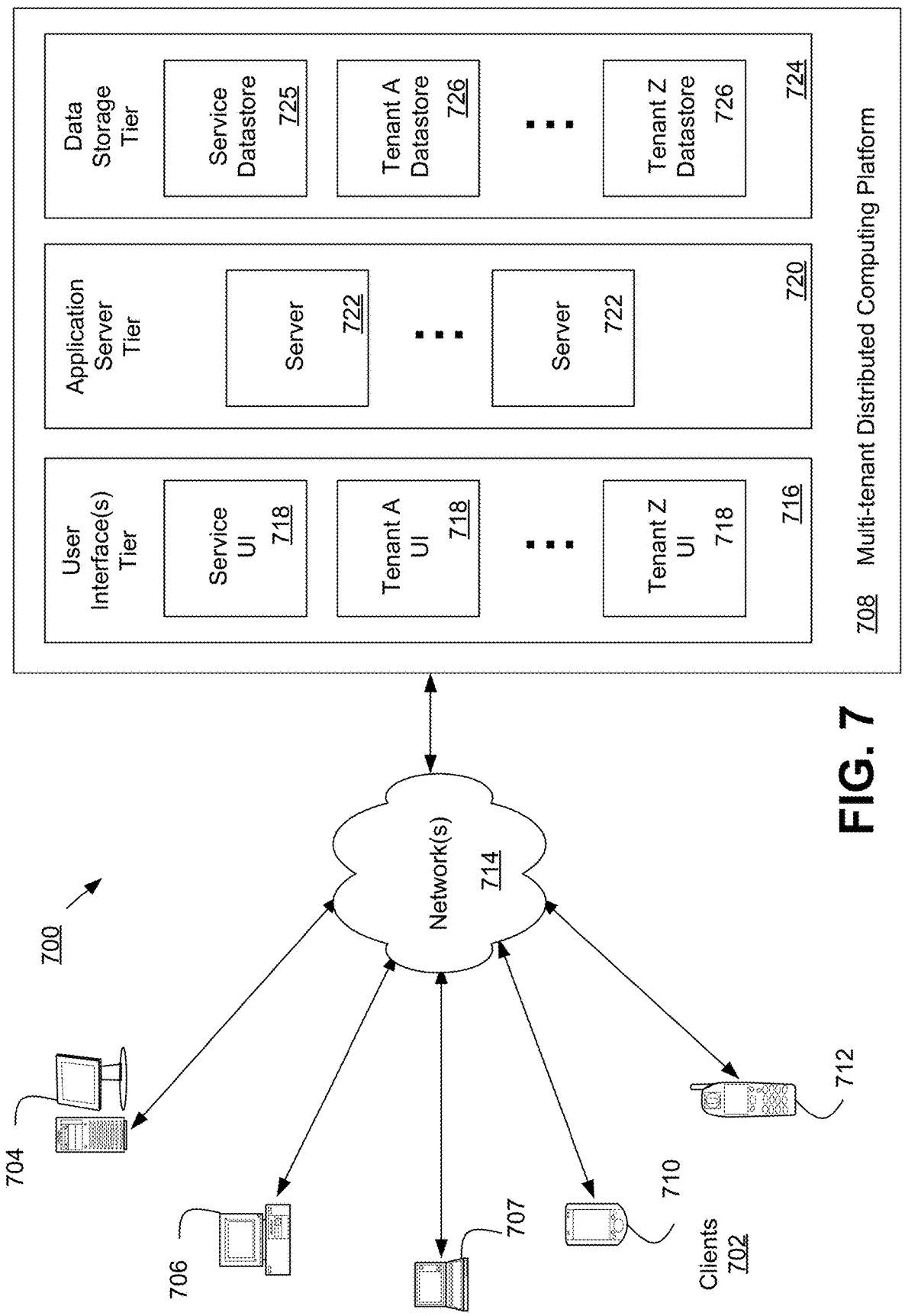
FIG. 7 illustrates an embodiment of a multi-tenant distributed computing service platform.

FIG. 7 is a diagram illustrating elements or components of an example operating environment 700 in which an embodiment of the invention may be implemented. As shown, a variety of clients 702 incorporating and/or incorporated into a variety of computing devices may communicate with a distributed computing service/platform 708 through one or more networks 714. For example, a client may incorporate and/or be incorporated into a client application (e.g., software) implemented at least in part by one or more of the computing devices.

Examples of suitable computing devices include personal computers, server computers 704, desktop computers 706, laptop computers 708, notebook computers, tablet computers or personal digital assistants (PDAs) 710, smart phones 712, cell phones, and consumer electronic devices incorporating one or more computing device components, such as one or more electronic processors, microprocessors, central processing units (CPU), or controllers. Examples of suitable networks 714 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 708 may include multiple processing tiers, including a user interface tier 716, an application server tier 720, and a data storage tier 724. The user interface tier 716 may maintain multiple user interfaces 718, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 724 may include one or more data stores, which may include a Service Data store 725 and one or more Tenant Data stores 726.

Each tenant data store 726 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 708 may be multi-tenant and service platform 708 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 722 that are part of the platform's Application Server Tier 720.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions.

In addition to ERP and CRM functions, a business information system/platform (such as element 708 of FIG. 7(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 722 that are part of the platform's Application Server Tier 720.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 708 of FIG. 7).

As noted with regards to FIG. 6, the integrated business system shown in FIG. 7 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by a processor of a computing device having a zero data loss recovery appliance causes the processor to:
    maintain, by a zero data loss recovery appliance, one or more virtual full backups of a database hosted by a first platform located on a first remote computing device, wherein each of the one or more virtual full backups comprises metadata referencing i) data blocks of an incremental backup of the database corresponding to changes to the database since a last prior backup of the database, ii) data blocks of all previous incremental backups of the database that occurred prior to the incremental backup of the database, and iii) data blocks of a full backup of the database;
    receive, by the recovery appliance, a migration command to migrate the database from the first platform to a second platform located on a second remote computing device;
    evaluate, by the recovery appliance, the one or more virtual full backups to identify a target virtual full backup of the database to use for migration to the second platform based upon the target virtual full backup being a latest virtual full backup of data of the database to be migrated, wherein the latest virtual full backup of data is determined using a timestamp that corresponds to a point in time in which the virtual full backup was created and a creation time of the incremental backup from which the virtual full backup was created; and
    perform, by the recovery appliance, a migration operation to migrate the database from the first platform to the second platform using the target virtual full backup to create a migrated database on the second platform, the migration operation comprising:
        parsing, by the recovery appliance, the metadata of the target virtual full backup to identify and then migrate the data blocks of the full backup, the data blocks of the incremental backup, and the data blocks of the previous incremental backups into the migrated database; and
        removing, by the recovery appliance, the database from the first platform.

2. The non-transitory computer-readable medium of claim 1, wherein the first platform has an operating environment that is incompatible with an operating environment of the second platform.

3. The non-transitory computer-readable medium of claim 1, wherein the instructions comprise instructions to:
    establish a first connection over a network between the recovery appliance and the database hosted by the first platform on the first remote computing device;
    receive, by the recovery appliance, a full backup of the database over the first connection from the first remote computing device;
    receive, by the recovery appliance, periodic incremental backups of incremental changes to the database over the first connection from the first remote computing device; and
    generate, by the recovery appliance, the one or more virtual full backups using the full backup and the incremental backups, wherein a new virtual full backup of the database is generated by:
        converting an incoming incremental backup of the database corresponding to a first point in time to a virtual representation of an incremental full backup of the database as of the first point in time to create the new virtual full backup comprising metadata referencing i) data blocks of the incoming incremental backup of the database, ii) data blocks of previous incremental backups of the database that occurred prior to the incoming incremental backup of the database, and iii) the data blocks of the full backup of the database.

4. The non-transitory computer-readable medium of claim 1, wherein the instructions comprise instructions to:
    in response to receiving the migration command:
    transmit, by the recovery appliance, a command to the first platform to transition the database into a read-only state for creating a target incremental backup of the database;
    invoke, by the recovery appliance, the first platform to create the target incremental backup to comprise changes made to the database since a last prior backup of the database with respect to the target incremental backup;
    receive, by the recovery appliance, the target incremental backup from the first platform over a network; and
    utilize, by the recovery appliance, the target incremental backup to create the target virtual full backup.

5. The non-transitory computer-readable medium of claim 4, wherein the command instructs the first platform to transition the database into a read and write state in response to the target incremental backup being created, wherein the database is maintained in the read and write state during the migration operation.

6. The non-transitory computer-readable medium of claim 1, wherein the instructions comprise instructions to:
    parse, by the recovery appliance, the migration command to identify a set of tablespaces on the database for the migration;
    identify, by the recovery appliance, data files associated with the set of tablespaces to migrate; and evaluate, by the recovery appliance, the virtual full backups to identify the target virtual full backup as a latest virtual full backup of the data files.

7. The non-transitory computer-readable medium of claim 1, wherein the instructions comprise instructions to:
in response to receiving an incremental backup of the database, perform, by the recovery appliance, a verification upon the incremental backup to verify an integrity of the incremental backup;
in response to receiving a full back up of the database, perform, by the recovery appliance, a verification upon the full backup to verify an integrity of the full backup; and
in response to verifying the integrity of the incremental backup and the full backup, utilize, by the recovery appliance, the incremental backup and the full backup to create a virtual full backup of the database.

8. The non-transitory computer-readable medium of claim 1, wherein the instructions comprise instructions to:
parse, by the recovery appliance, the migration command to identify a set of tablespaces on the database for the migration;
execute, by the recovery appliance, a database function to determine whether the set of tablespaces are transportable to the second platform; and
in response to determining that the set of tablespaces are not transportable, create, by the recovery appliance, an error message indicating that the migration command cannot be performed.

9. The non-transitory computer-readable medium of claim 1, wherein the first platform comprises a first operating system and the second platform comprises a second operating system having an operating system type different than the first operating system.

10. A computing system, comprising:
a processor connected to memory; and
a migration module associated with a zero data loss recovery appliance stored on a non-transitory computer readable medium and configured with instructions that when executed by the processor cause the processor to:
maintain, by a zero data loss recovery appliance, one or more virtual full backups of a database hosted by a first platform located on a first remote computing device, wherein each of the one or more virtual full backups comprises metadata referencing i) data blocks of an incremental backup of the database corresponding to changes to the database since a last prior backup of the database, ii) data blocks of all previous incremental backups of the database that occurred prior to the incremental backup of the database, and iii) data blocks of a full backup of the database;
receive, by the recovery appliance, a migration command to migrate the database from the first platform to a second platform located on a second remote computing device;
evaluate, by the recovery appliance, the one or more virtual full backups to identify a target virtual full backup of the database to use for migration to the second platform based upon the target virtual full backup being a latest virtual full backup of data of the database to be migrated, wherein the latest virtual full backup of data is determined using a timestamp that corresponds to a point in time in which the virtual full backup was created and a creation time of the incremental backup from which the virtual full backup was created; and
perform, by the recovery appliance, a migration operation to migrate the database from the first platform to the second platform using the target virtual full backup to create a migrated database on the second platform, the migration operation comprising:
parsing, by the recovery appliance, the metadata of the target virtual full backup to identify and then migrate the data blocks of the full backup of the database, the data blocks of the incremental backup of the database, and the data blocks of the previous incremental backups of the database into the migrated database; and
removing, by the recovery appliance, the database from the first platform.

11. The computing system of claim 10, wherein the instructions comprise instructions that cause the processor to:
receive, by the recovery appliance, a request to restore corrupted data of the database hosted by the first platform;
evaluate, by the recovery appliance, the virtual full backups to identify a virtual full backup of the database to use for restoring the corrupted data of the database based upon the virtual full backup being a latest backup of the corrupted data; and
utilize, by the recovery appliance, the virtual full backup to restore the corrupted data of the database by restoring the data blocks of the full backup of the database, the data blocks of the incremental backup of the database, and the data blocks of the previous incremental backups of the database into the migrated database associated with the virtual full backup into the database to replace the corrupted data.

12. The computing system of claim 10, wherein the first platform has an operating environment that is incompatible with an operating environment of the second platform.

13. The computing system of claim 10, wherein the instructions comprise instructions that cause the processor to:
in response to receiving the migration command, invoke, by the recovery appliance, the first platform to create a target incremental backup of the database;
receive, by the recovery appliance, the target incremental backup from the first platform over a network; and
utilize, by the recovery appliance, the target incremental backup to create the target virtual full backup.

14. The computing system of claim 13, wherein the instructions comprise instructions that cause the processor to:
transmit, by the recovery appliance, a command to the first platform to transition the database into a read-only state for creating the target incremental backup.

15. The computing system of claim 14, wherein the command instructs the first platform to transition the database into a read and write state in response to the target incremental backup being created.

16. A computer-implemented method, the computer-implemented method involving a computing device associated with a zero data loss recovery appliance, wherein the computing device comprises a processor, and the computer-implemented method comprising:
maintaining, by a zero data loss recovery appliance, one or more virtual full backups of a database hosted by a first platform located on a first remote computing device, wherein each of the one or more virtual full backups comprises metadata referencing i) data blocks of an incremental backup of the database corresponding to changes to the database since a last prior backup of the database, ii) data blocks of all previous incremental backups of the database that occurred prior to the incremental backup of the database, and iii) data blocks of a full backup of the database;

receiving, by the recovery appliance, a migration command to migrate the database from the first platform to a second platform located on a second remote computing device;

evaluating, by the recovery appliance, the one or more virtual full backups to identify a target virtual full backup of the database to use for migration to the second platform based upon the target virtual full backup being a latest virtual full backup of data of the database to be migrated, wherein the latest virtual full backup of data is determined using a timestamp that corresponds to a point in time in which the virtual full backup was created and a creation time of the incremental backup from which the virtual full backup was created; and performing, by the recovery appliance, a migration operation to migrate the database from the first platform to the second platform using the target virtual full backup to create a migrated database on the second platform, the migration operation comprising:

parsing, by the recovery appliance, the metadata of the target virtual full backup of the database to identify and then migrate the data blocks of the full backup of the database, the data blocks of the incremental backup of the database, and the data blocks of the previous incremental backups of the database into the migrated database; and removing, by the recovery appliance, the database from the first platform.

17. The computer-implemented method of claim 16, further comprising:

receiving, by the recovery appliance, periodic incremental backups of incremental changes to the migrated database from the second platform of the second remote computing device; and generating, by the recovery appliance, virtual full backups of the migrated database using the periodic incremental changes, wherein a new virtual full backup is generated by:

converting, by the recovery appliance, an incoming incremental backup corresponding to a first point in time of the migrated database to a virtual representation of an incremental full backup as of the first point in time to create the new virtual full backup comprising metadata referencing i) data blocks of the incoming incremental backup, ii) data blocks of previous incremental backups that occurred prior to the incoming incremental backup, and iii) data blocks of a full backup of the migrated database.

18. The computer-implemented method of claim 17, further comprising:

receiving, by the recovery appliance, a request to restore corrupted data of the migrated database hosted by the second platform of the second remote computing device;

evaluating, by the recovery appliance, the virtual full backups of the migrated database to identify a virtual full backup of the migrated database to use for restoring the corrupted data of the migrated database based upon the virtual full backup being a latest backup of the corrupted data; and utilizing, by the recovery appliance, the virtual full backup of the migrated database to restore the corrupted data of the migrated database by restoring data blocks referenced by the virtual full backup into the migrated database to replace the corrupted data.

19. The computer-implemented method of claim 16, wherein the first platform comprises a first operating system version and the second platform comprises a second operating system version different than the first operating system version.

* * * * *